United States Patent
Diekamp

(10) Patent No.: US 9,414,545 B2
(45) Date of Patent: Aug. 16, 2016

(54) SEPARATING DEVICE FOR A COMBINE HARVESTER

(71) Applicant: CLAAS Selbstfahrende Erntemaschinen GmbH, Harsewinkel (DE)

(72) Inventor: Andreas Diekamp, Guetersloh (DE)

(73) Assignee: CLAAS Selbstfahrende Erntemaschinen GmbH, Harsewinkel (DE)

(*) Notice: Subject to any disclaimer, the term of this patent is extended or adjusted under 35 U.S.C. 154(b) by 0 days.

(21) Appl. No.: 14/687,054

(22) Filed: Apr. 15, 2015

(65) Prior Publication Data

US 2015/0305242 A1    Oct. 29, 2015

(30) Foreign Application Priority Data

Apr. 24, 2014 (DE) .......................... 10 2014 105 777

(51) Int. Cl.
*A01F 12/44* (2006.01)
*A01F 7/06* (2006.01)
*A01D 41/12* (2006.01)

(52) U.S. Cl.
CPC .............. *A01F 12/442* (2013.01); *A01D 41/12* (2013.01); *A01F 7/067* (2013.01)

(58) Field of Classification Search
CPC ........... A01F 7/06; A01F 7/062; A01F 7/065; A01F 7/067; A01F 12/20; B02B 3/06
USPC ............................................. 460/69, 109, 62
See application file for complete search history.

(56) References Cited

U.S. PATENT DOCUMENTS

| | | | | |
|---|---|---|---|---|
| 4,258,726 A | * | 3/1981 | Glaser ..................... | A01F 12/24 460/109 |
| 4,330,000 A | * | 5/1982 | Peiler ...................... | A01F 12/28 460/109 |
| 5,913,724 A | * | 6/1999 | Roberg ................... | A01F 12/40 460/112 |
| 6,152,820 A | * | 11/2000 | Heidjann ................ | A01F 12/40 460/112 |
| 7,682,236 B2 | | 3/2010 | Bueermann et al. | |
| 8,251,787 B2 | | 8/2012 | Barrelmeyer et al. | |

FOREIGN PATENT DOCUMENTS

EP    1894465    3/2008
EP    2 428 109    3/2012

* cited by examiner

*Primary Examiner* — John G Weiss
(74) *Attorney, Agent, or Firm* — Michael J. Striker

(57) ABSTRACT

A separating device for a combine harvester that operates according to the principle of axial flow includes a housing with a separating grate arrangement and a cover arrangement that jointly form a hollow cylinder. A separating rotor is accommodated in the hollow cylinder in a rotatably supported manner such that an intermediate space (Z1) is defined between the housing and the separating rotor for conveying crop circumferentially and along a longitudinal axis (LA) of the separating rotor. Crop stream engagement means provided on an inner surface of the cover arrangement facing the separating rotor engages radially, in a ramp-type manner around the circumference of the separating rotor, into a crop stream that circulates in the intermediate space. The crop stream engagement means are adjustable to change a radial engagement depth. Drive means connected to the crop stream engagement means are activated from outside the housing to drive the adjustment.

9 Claims, 4 Drawing Sheets

SEPARATING DEVICE FOR A COMBINE HARVESTER

CROSS-REFERENCE TO A RELATED APPLICATION

The invention described and claimed hereinbelow is also described in German Patent Application 10 2014 105777.5, filed on Apr. 24, 2014. The German Patent Application, the subject matters of which is incorporated herein by reference, provides the basis for a claim of priority of invention under 35 U.S.C. 119(a)-(d).

BACKGROUND OF THE INVENTION

The invention relates to a separating device for a combine harvester that operates according to the principle of axial flow.

A separating devices that operates according to the principle of axial flow is described in EP 2 428 109 B1, for example. The separating device therein comprises a housing having a separating grate arrangement and a cover arrangement that jointly form a hollow cylinder, a separating rotor accommodated in the hollow cylinder of the housing in a rotatably supported manner such that an intermediate space is defined between the housing and the separating rotor for conveying crop circumferentially and along a longitudinal axis of the separating rotor. Crop stream engagement means are provided on an inner surface of the cover arrangement facing the separating rotor, which are designed to engage radially, in a ramp-type manner around the circumference of the separating rotor, into a crop stream. The crop stream circulates in the intermediate space during the circumferential conveyance of the crop stream, in order to loosen said crop stream in order to increase the separating output.

The known crop stream engagement means comprise at least one ramp-shaped crop stream engagement element, wherein a ramp height and, therefore, an intensity of the engagement of the crop stream engagement element into the circulating crop stream is fixedly defined by an angle of inclination or angling that is defined between the inner surface of the cover arrangement and the crop stream engagement element.

By use of the ramp-shaped crop stream engagement element on the inner surface of the cover arrangement, the crop stream, which circulates on the inner surface of the cover arrangement and is thereby compressed to form a crop mat, is loosened again in that the crop stream is lifted off the inner surface of the cover arrangement by the crop stream engagement element and subsequently falls back down onto said inner surface.

In order to permit the engagement intensity of the crop stream engagement element into the circulating crop stream to be adapted to different operating conditions, such as different crop, the crop stream engagement element is detachably fastened on the inner surface of the cover arrangement. Therefore, a crop stream engagement element that predefines a fixed ramp height can be exchanged, as necessary, for another crop stream engagement element that predefines a different fixed ramp height. In order to perform such a replacement, however, the separating device must be brought to a standstill, whereby limits are set on the operational variability of the separating device.

SUMMARY OF THE INVENTION

The present invention overcomes the shortcomings of known arts, such as those mentioned above.

To that end, the present invention provides a separating device for a combine harvester, which operates according to the principle of axial flow. The separating device comprises a housing having a separating grate arrangement and a cover arrangement, which jointly form a hollow cylinder, and a separating rotor that is accommodated in the hollow cylinder of the housing in a rotatably supported manner such that an intermediate space is defined between the housing and the separating rotor for conveying crop circumferentially and along a longitudinal axis of the separating rotor. A crop stream engagement means is provided on an inner surface of the cover arrangement facing the separating rotor. The crop stream engagement means is designed to engage radially, in a ramp-type manner around the circumference of the separating rotor, into a crop stream, which circulates in the intermediate space during the circumferential conveyance of the crop stream.

The crop stream engagement means is adjustable such that a radial engagement depth of the crop stream engagement means into the intermediate space defined between the housing and the separating rotor can be changed. Also, a drive means is provided that is connected to the crop stream engagement means in order to drive an adjustment thereof. The drive means is activated from outside the housing in order to drive the adjustment of the crop stream engagement means.

Given that the crop stream engagement means is adjustable such that the radial engagement depth thereof into the intermediate space defined between the housing and the separating rotor can be changed, an intensity of the engagement of the crop stream engagement element into the circulating crop stream can be changed and, therefore, adapted to different operating conditions, such as different crop, in order to optimize the separating output.

Given that the drive means, which is connected to the crop stream engagement means in order to drive an adjustment thereof, can be activated from outside the housing in order to drive the adjustment of the crop stream engagement means, the adjustment of the radial engagement depth thereof can be easily carried out during operation of the separating device, thereby increasing the operational variability of the separating device.

According to the invention, the separating grate arrangement comprises one or more sieve-type separating grates, which are lined up next to one another in a row lengthwise along the longitudinal axis of the separating rotor. A plurality of passage openings is provided in each separating grate, through which a crop portion to be separated out, such as grain from a crop stream that circulates in the intermediate space defined between the housing and the separating rotor, is separated out.

According to the invention, the cover arrangement comprises one or more cover elements, which are lined up next to one another lengthwise in a row along the longitudinal axis of the separating rotor.

In an embodiment, the crop stream engagement means comprises at least one crop stream engagement element having a width, which is bordered by two longitudinal edges of the crop stream engagement element extending along the longitudinal axis of the separating rotor. The at least one crop stream engagement element has a length, along the longitudinal axis of the separating rotor, which corresponds to at least a portion of an axial extension of the inner surface of the cover arrangement.

In other words, the at least one crop stream engagement element extends along the longitudinal axis of the separating rotor along the entire axial extension of the inner surface of the cover arrangement or along only a portion of the axial extension of the inner surface of the cover arrangement, depending on the desired configuration. According to the invention, it also is possible that a plurality of crop stream engagement elements, which have the same design as the at least one crop stream engagement element, are disposed lengthwise one behind the other, without or with intermediate spaces, along the longitudinal axis of the separating rotor, and each thereby extends along a portion of the axial extension of the inner surface of the cover arrangement. In this manner, the intensity of the radial engagement of the crop stream engagement means into the intermediate space defined between the housing and the separating rotor can be additionally configured beyond the axial extension of the inner surface of the cover arrangement and can therefore be adapted to operating conditions that set in, in order to optimize the separating output.

The crop stream engagement means preferably extends lengthwise along the entire length of the separating grate arrangement. According to the invention, the at least one crop stream engagement element of the crop stream engagement means extends lengthwise along the entire length of the at least one separating grate of the separating grate arrangement, or a plurality of crop stream engagement elements that are lined up next to one another in a row are provided, which extend lengthwise along the entire length of the at least one separating grate of the separating grate arrangement. In addition, a plurality of separating grates lined up next to one another in a row is provided, wherein each crop stream engagement element of a plurality of crop stream engagement elements lined up next to one another in a row extends along the entire length of a separating grate, wherein the position of each separating grate corresponds to the position of the respective crop stream engagement element. Other configurations are also conceivable, of course, within the scope of the invention.

In an embodiment, one of the two longitudinal edges of the at least one crop stream engagement element is pivotably mounted on a pivot axis extending along the longitudinal axis of the separating rotor such that, in order to adjust the crop stream engagement means, an angling defined between the inner surface of the cover arrangement and the at least one crop stream engagement element can be changed by pivoting the crop stream engagement element about the pivot axis.

Providing the adjustability of the at least one crop stream engagement element by means of a pivotable design thereof is a simple and, therefore, cost-effective solution. In addition, a pivotable design of the crop stream engagement element ensures the robustness that is required for field use.

As an alternative to the pivotable design, the adjustability of the at least one crop stream engagement element is provided by a linear displaceability of the at least one crop stream engagement element.

In an embodiment, a passage slot, which extends lengthwise along the longitudinal axis of the separating rotor, is formed in the cover arrangement and the at least one crop stream engagement element is inserted longitudinally into the passage slot such that the one longitudinal edge of the crop stream engagement element supported on the pivot axis protrudes outwardly out of the housing and the other longitudinal edge of the crop stream engagement element is disposed within the housing, wherein the pivot axis is disposed outside of the housing.

Given that the pivot axis or rotational axis of the at least one crop stream engagement element is disposed outside of the housing, the pivot axis is located in the circulating crop stream during operation of the separating device and therefore does not adversely affect this circulating crop stream.

In an embodiment, the passage slot has such a width around the circumference of the separating rotor that the at least one crop stream engagement element can rest against the inner surface of the cover arrangement given a minimum angling. Therefore, in a minimum engagement setting of the at least one crop stream engagement element, which can also be an out-of-service position, it is possible to provide a stable and defined end position for the at least one crop stream engagement element.

In an embodiment, the at least one crop stream engagement element is designed such that, given a minimum angling thereof, the crop stream engagement element closes the passage slot in the region of the length of the at least one crop stream engagement element.

To this end, the at least one crop stream engagement element is designed so as to be closed in a planar manner, e.g., in the region that interacts with the passage slot, and, given a minimum angling, can rest against an outer surface of the cover arrangement and against the inner surface of the cover arrangement along the passage opening, in a manner similar to that of a valve flap, and thereby close the passage slot.

When the at least one crop stream engagement element is in the minimum engagement position or the out-of-service position, it can thereby be reliably ensured that crop can pass through the passage slot and exit the hollow cylindrical housing of the separating device.

In an embodiment, the separating device furthermore comprises a covering arrangement, which has a length along the longitudinal axis of the separating rotor that corresponds at least to the length of the passage slot and has a width around the circumference of the separating rotor that is greater than the width of the passage slot, wherein the covering arrangement is disposed radially outward of the pivot axis and lengthwise along the length of the passage slot such that the covering arrangement covers the passage slot so as to span the width thereof.

Use of the covering arrangement makes it possible to prevent the situation in which crop passes through the passage slot and emerges from the hollow cylindrical housing of the separating device, even in the positions of the at least one crop stream engagement element that deviate from the minimum engagement position, e.g., in a maximum engagement position having a maximum angling. According to the invention, the covering arrangement comprises a single covering element, which has at least the length of the passage slot, or a plurality of covering elements, which are lined up next to one another in a row along the longitudinal axis of the separating rotor or the length of the passage slot. The covering elements, in totality, have at least the length of the passage slot.

In an embodiment, the covering arrangement comprises at least one passage opening in the region of the pivot axis, wherein the drive means is disposed outside of the housing and the at least one crop stream engagement element is drivingly connected to the drive means through the at least one passage opening.

Given that the at least one passage opening is provided in the region of the pivot axis located between the cover arrangement and the covering arrangement, the passage opening is covered by the pivot axis on the passage-slot side, thereby preventing the situation in which crop passes through the passage opening.

Given that the drive means is disposed outside of the housing, the drive means is not exposed to contamination by the crop stream and are easier to activate on the outside of the housing.

In an embodiment, the at least one crop stream engagement element is designed so as to be closed in a planar manner across a predetermined width section proceeding from the longitudinal edge of said crop stream engagement element that is supported on the pivot axis, and a plurality of engagement fingers adjoin the width section that is closed in a planar manner. The engagement fingers extend next to one another in a comb-like manner, the free ends of which jointly define the other longitudinal edge of the crop stream engagement element.

Due to this comb-type or rake-type embodiment of the at least one crop stream engagement element, it is possible, during operation of the separating device, for example, for straw from a crop stream circulating in the intermediate space to be deflected from the inner surface of the cover arrangement and to be loosened and, simultaneously, grain contained in the crop stream can pass between the engagement fingers and be transported along the inner surface of the cover arrangement to the separating grate arrangement and, there, can exit the housing in order to be separated out.

According to the invention, the engagement fingers extend in the direction of the longitudinal axis of the separating rotor without inclination such that the engagement fingers do not affect the transport of the crop stream in the axial direction, or the engagement fingers extend in the direction of the longitudinal axis of the separating rotor with a predetermined inclination such that the engagement fingers affect the transport of the crop stream in the axial direction in a targeted manner.

For example, a plurality of guide elements or guide rails is provided on the inner surface of the cover arrangement. The guide elements or guide rails are disposed next to one another in the form of a spiral and coaxial to the longitudinal axis of the separating rotor, and extend circumferentially, in sections, in the radial direction of the cover arrangement. Due to the spiral-shaped extension, the guide elements have a directional component in the axial direction of the separating rotor and thereby support an axial conveyance of the crop stream from an inlet of the separating device along the longitudinal axis of the separating rotor to an outlet of the separating device. In this connection, the engagement fingers of the crop stream engagement element extend in the direction of the longitudinal axis of the separating rotor with such an inclination that the extension direction thereof corresponds to that of the guide elements.

In an embodiment, the crop stream engagement means comprises a plurality of crop stream engagement elements, which have the same design as the at least one crop stream engagement element and are disposed lengthwise one behind the other, without or with longitudinal spacing, along the longitudinal axis of the separating rotor. The crop stream engagement elements are adjusted independently of one another such that the respective radial engagement depth thereof into the intermediate space can be changed. In addition, the drive means for each of the crop stream engagement elements has a separate drive unit, which is connected to the respective crop stream engagement element in order to drive an adjustment thereof and which can be activated from outside the housing for driving the adjustment of the respective crop stream engagement element.

Given that a plurality of independently adjustable crop stream engagement elements is provided, the separating device according to the invention is better adapted to the particular prevailing operating conditions in order to optimize the separating output.

In an embodiment, the drive means for driving the adjustment of the at least one crop stream engagement element comprises a pneumatic cylinder. Each drive unit of the drive means preferably comprises a pneumatic cylinder for driving the adjustment of the respectively connected crop stream engagement element.

Since the compressed air used in a pneumatic cylinder for performing adjustments has a certain compressibility and, therefore, the crop stream engagement element that is being adjusted is allowed to deflect, preferably in the direction of the minimum engagement position, starting at a certain level of force application, it is possible for the pneumatic cylinder to provide an overload protection function simultaneously with the adjustment drive function thereof for the pertinent crop stream engagement element.

In an embodiment, the drive means for driving the adjustment of the at least one crop stream engagement element comprises a hydraulic cylinder. Each drive unit of the drive means preferably comprises a hydraulic cylinder for driving the adjustment of the respectively connected crop stream engagement element.

A pressure-limiting valve assigned to the hydraulic circuit of the at least one hydraulic cylinder is used to permit the respectively adjustably driven crop stream engagement element to deflect, preferably in the direction of the minimum engagement position, starting at a certain level of force application, in order to thereby provide an overload protection function.

BRIEF DESCRIPTION OF THE DRAWINGS

Further features and advantages of the invention will become apparent from the description of embodiments that follows, with reference to the attached figures, wherein.

DETAILED DESCRIPTION OF THE PREFERRED EMBODIMENTS

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

A separating device 10 of a combine harvester (not shown in entirety and not labeled separately), which operates according to the principle of axial flow and is designed according to the invention is described in the following with reference to FIGS. 1 to 4.

Figure 1:
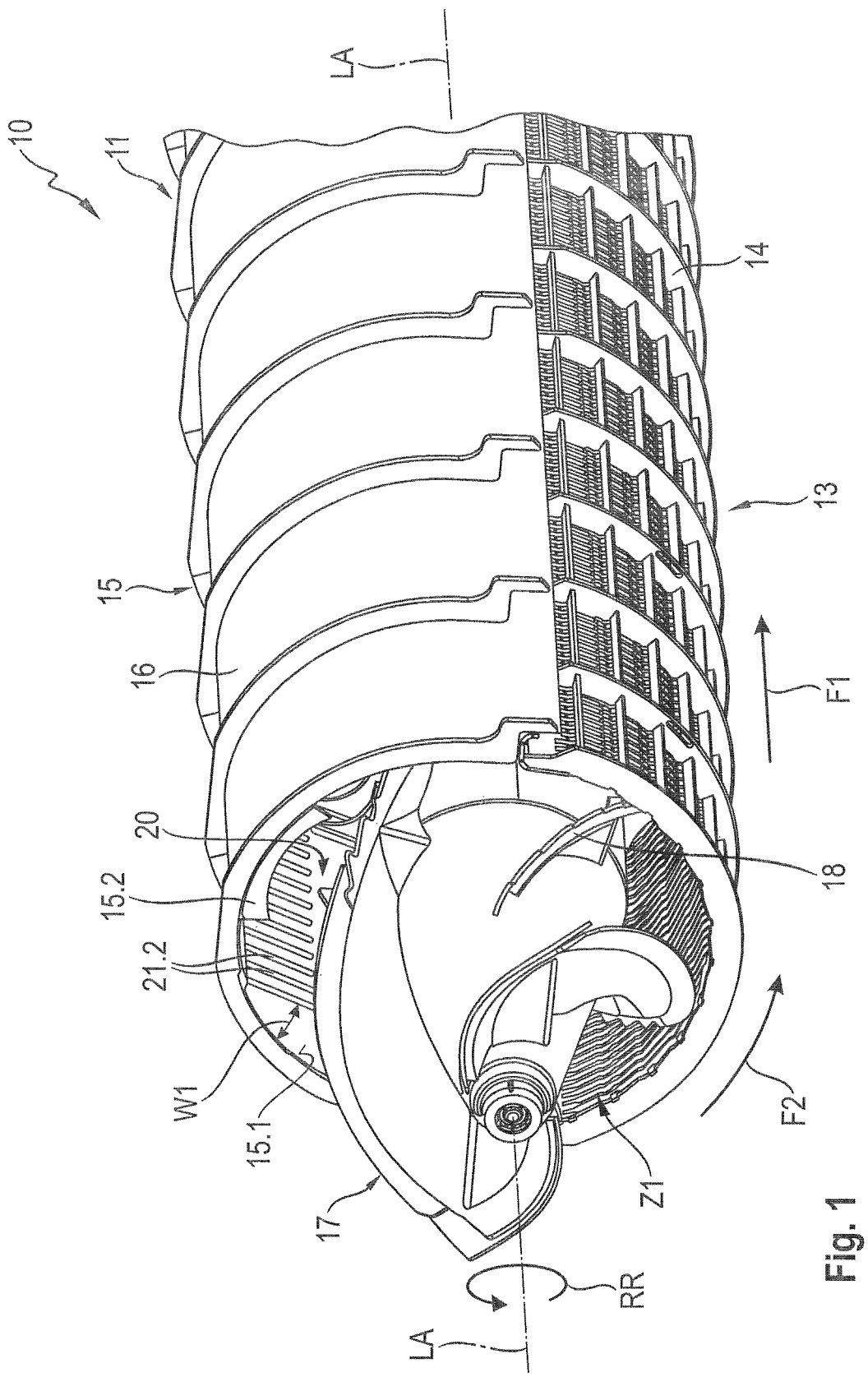
FIG. 1 presents a perspective partial view of an inventive separating device, which operates according to the principle of axial flow, of a separating assembly of a combine harvester.
Figure 2:
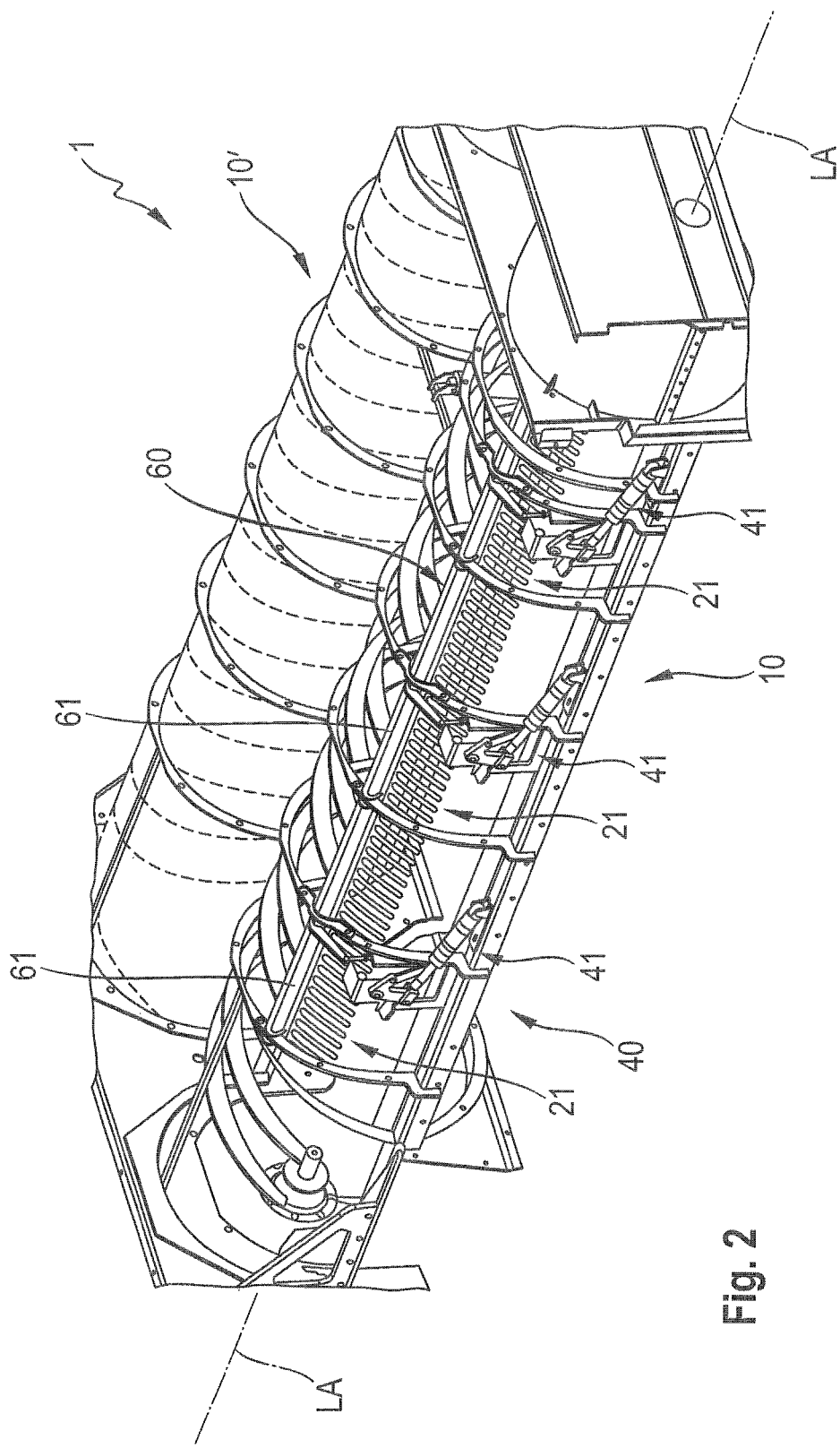
FIG. 2 presents a perspective partial view of the separating assembly from FIG. 1, which is equipped with two separating devices.

FIG. 1 shows a perspective partial view of the separating device 10, where FIG. 2 shows a perspective partial view of a separating assembly 1 of the combine harvester, which is equipped with two separating devices 10, 10'. Since the two separating devices 10, 10' are designed identically to one another except for the mirror-image configuration and, therefore, the opposing rotational directions RR thereof (see FIG. 1), only the separating device 10 on the left, i.e., in the front, in FIG. 2 will be described in detail in the following. The details of separating device 10 apply to identical or similar components, along with the same reference signs, to the separating device 10' shown on the right, i.e., at the rear in FIG. 2.

As shown in FIG. 1, the separating device 10 comprises a housing 11 having a separating grate arrangement 13 and a cover arrangement 15, which jointly form a hollow cylinder. A separating rotor 17 is accommodated in the hollow cylinder of the housing 11 in a rotatably supported manner such that an intermediate space Z1 is defined between the housing 11 and the separating rotor 17 for conveying crop (not illustrated), such as grain, circumferentially and along a longitudinal axis LA of the separating rotor 17. The longitudinal axis LA, as the central longitudinal axis, simultaneously forms a rotational axis of the separating rotor 17.

Figure 3:
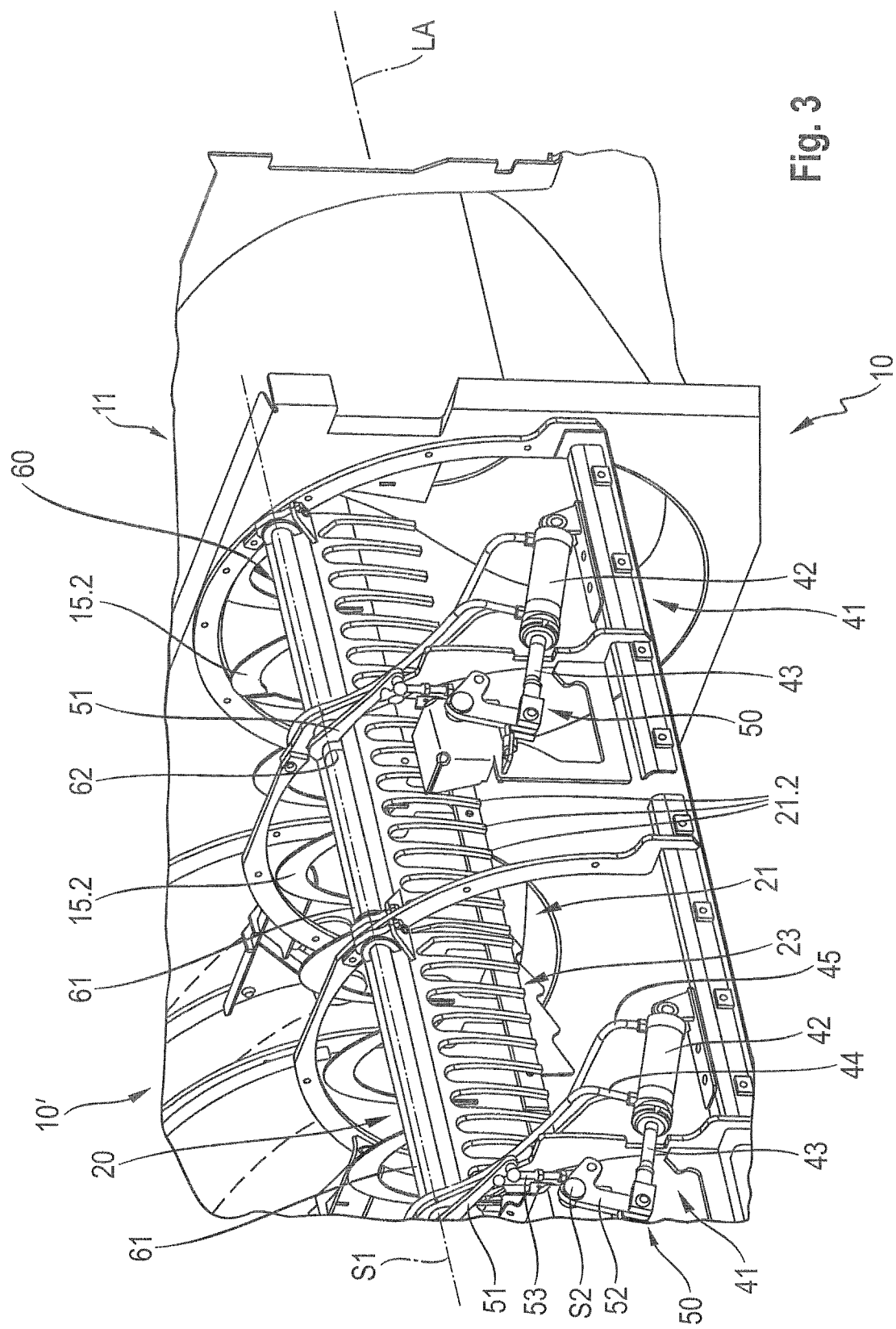
FIG. 3 presents an enlarged perspective partial view of the separating device from FIG. 1.
Figure 4:
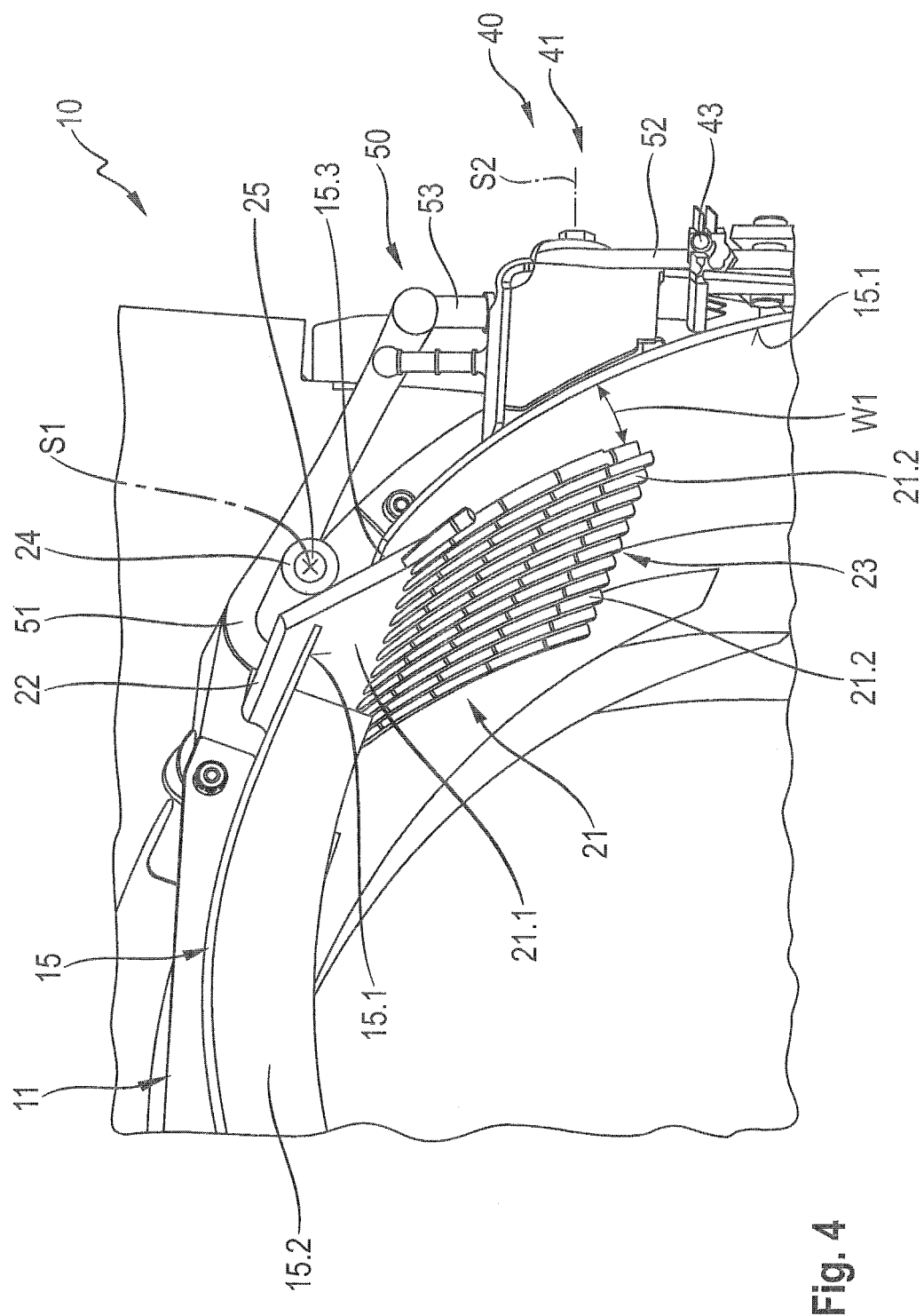
FIG. 4 presents a different perspective of a further enlarged view of a region of the separating device from FIG. 3.

The separating grate arrangement 13 and the separating rotor 17 are omitted in FIGS. 2 to 4, where a wall of the cover arrangement 15 is depicted as being transparent in FIGS. 2 and 3, for exemplary purposes.

In order to convey the crop, the separating rotor 17 is equipped on the circumferential surface thereof with driving elements 18. D driving elements 18 span the circumferential surface in the shape of a spiral and convey the crop in an axial conveyance direction F1 and in a circumferential conveyance direction F2 of the separating device 10.

The separating grate arrangement 13 comprises at least one sieve-type separating grate 14, which forms a separating region of the separating device 10. Preferably, a plurality of separating grates 14 are disposed parallel to the longitudinal axis LA of the separating rotor 17 and are arranged one behind the other in the axial direction. The separating grate arrangement 13 comprises a plurality of passage openings (not labeled separately), through which components (such as grain, for example) can be separated out of a crop stream that is fed to the separating unit 10.

The cover arrangement 15 comprises at least one cover element 16. The cover arrangement 15 and the separating grate arrangement 13, which are connected to one another, each enclose approximately one-half of the separating rotor 17, as viewed in the circumferential direction, and therefore define the hollow cylinder of the housing 11. Preferably, a plurality of cover elements 16 are disposed parallel to the longitudinal axis LA of the separating rotor 17 and are arranged one behind the other in the axial direction.

The cover arrangement 15 comprises, on an inner surface 15.1 thereof facing the separating rotor 17, a plurality of guide elements 15.2. The guide elements 15.2 are disposed next to one another coaxial to the longitudinal axis LA of the separating rotor 17, in a spiral shape and extend circumferentially in sections in the radial direction of the cover arrangement 15.

Due to the spiral-shaped extension thereof, the guide elements 15.2 have a directional component in the axial conveyance direction F1 of the separating rotor 17 and thereby support an axial conveyance of the crop stream from an inlet of the separating device 10 along the longitudinal axis LA of the separating rotor 17 to an outlet of the separating device 10.

In addition, crop stream engagement means 20 is provided on the inner surface 15.1 of the cover arrangement 15 facing the separating rotor 17. The crop stream engagement means 20 is designed to engage radially, in a ramp-type manner around the circumference of the separating rotor 17 (i.e., in the circumferential conveyance direction F2), into a crop stream, and circulates in the intermediate space Z1 in the circumferential conveyance direction F2 during the circumferential conveyance of the crop stream.

The crop stream engagement means 20 comprises a plurality of comb-type crop stream engagement elements 21 (see FIG. 2), which are disposed lengthwise one behind the other along the longitudinal axis LA of the separating rotor 17. The comb-type crop stream engagement elements 21 can be adjusted independently of one another such that the respective radial engagement depth thereof into the intermediate space Z1 can be changed.

A drive means 40 also is provided on the separating device 10, which is connected to the crop stream engagement means 20 in order to drive an adjustment thereof, and which are is activated from outside the housing 11 in order to drive the adjustment of the crop stream engagement means 20. More specifically, the drive means 40 for each of the crop stream engagement elements 21 has a separate drive unit 41, which is connected to the respective crop stream engagement element 21 in order to drive an adjustment thereof and which is activated from outside the housing 11.

As shown in FIGS. 3 and 4, each of the crop stream engagement elements 21 has a width, which is bordered by two longitudinal edges 22, 23 of the crop stream engagement element 21, which extend along the longitudinal axis LA of the separating rotor 17. In addition, each of the crop stream engagement elements 21 has a length, along the longitudinal axis LA of the separating rotor 17, which corresponds at least to a portion of an axial extension of the inner surface 15.1 of the cover arrangement 15. Preferably, each crop stream engagement element 21 extends along the entire length of a separating grate 14 of the separating grate arrangement 13, wherein the position of each separating grate corresponds to the position of the respective crop stream engagement element.

An upper longitudinal edge 22 (FIG. 4) of the two longitudinal edges 22, 23 of each crop stream engagement element 21 is connected, in a pivotably supported manner, to the housing 11 via a pivot axis S1. Pivot axis S1 is common to all crop stream engagement elements 21 and extends along the longitudinal axis LA of the separating rotor 17 such that, in order to adjust the crop stream engagement means 20 or in order adjust each of the crop stream engagement elements 21 separately, an angling W1 (see FIGS. 1 and 4) defined between the inner surface 15.1 of the cover arrangement 15 and the respective crop stream engagement element 21 can be changed by pivoting the crop stream engagement element 21 about the pivot axis S1.

More specifically, a passage opening 15.3 extending along the longitudinal axis LA of the separating rotor 17 is formed in the cover arrangement 15. Each of the crop stream engagement elements 21 is inserted longitudinally into the passage slot 15.3 such that the one longitudinal edge 22 of the crop stream engagement element 21, which is supported on the pivot axis S1, protrudes outwardly out of the housing 11 and the other longitudinal edge 23 of the crop stream engagement element 21 is disposed within the housing 11, in the intermediate space Z1 (FIG. 1).

The pivot axis S1 is located outside of the housing 11. Each crop stream engagement element 21 is connected, at one longitudinal edge 22 thereof, to a sleeve 24 extending longitudinally along the longitudinal axis LA of the separating rotor 17. The sleeve 24 has been rotatably slid onto an axle part 25, which extends lengthwise along the longitudinal axis LA of the separating rotor 17, is mounted on the housing 11, and is common to all crop stream engagement elements 21, thereby ensuring that the crop stream engagement element 21 can pivot about the pivot axis S1.

The separating device 10 also has a covering arrangement 60 (shown only in FIGS. 2 and 3, which has a length along the longitudinal axis LA of the separating rotor 17, which corresponds at least to the length of the passage slot 15.3. In addition, the covering arrangement 60 has a width circumferentially around the separating rotor 17, which is greater than the width of the passage slot 15.3. The covering arrangement 60 is disposed radially outward of the pivot axis S1 and lengthwise along the length of the passage slot 15.3 such that said covering arrangement covers the passage slot 15.3 so as to span the width thereof.

Preferably, the covering arrangement 60 comprises a plurality of covering elements 61, which are lined up next to one another in a row along the longitudinal axis LA of the separating rotor 17 or along the length of the passage slot 15.3. The covering elements, in totality, have at least the length of the passage slot 15.3.

A slot-shaped passage opening 62 is provided in the covering elements 61 of the covering arrangement 60 in the region of the pivot axis S1 for each crop stream engagement element 21 (FIG. 3). Extending through the passage opening 62, an adjusting lever 51 of a connecting linkage 50 of the drive unit 41 that is assigned to the respective crop stream engagement element 21 for driving the adjustment thereof is connected to the sleeve 24 of the applicable crop stream engagement element 21 provided on the one longitudinal edge 22.

Each of the drive units 41 of the drive means 40 is disposed outside of the housing 11 and comprises a pneumatic cylinder 42, the connecting rod 43 of which is connected, via a rocker arm 52, which can pivot about a pivot axis S2, and a ball head rod 53 of the connecting linkage 50, to a longitudinal end of the adjusting lever 51 of the connecting linkage 50 facing away from the sleeve 24.

Therefore, a retraction of the connecting rod 43 of the pneumatic cylinder 42 causes the rocker arm 52 to pivot in the counterclockwise direction and induces an upward movement of the ball head rod 53 of the connecting linkage 50. The upward movement of the ball head rod 53 induces an upward pivoting of the adjusting lever 51 of the connecting linkage 50, whereby the crop stream engagement element 21 drivingly connected thereto is pivoted in the direction of the inner surface 15.1 of the cover arrangement 15 such that the angling W1 is reduced. The radial engagement depth of the crop stream engagement element 21 into the intermediate space Z1 is therefore reduced.

Conversely, an extension of the connecting rod 43 of the pneumatic cylinder 42 causes the rocker arm 52 to pivot in the clockwise direction and induces a downward movement of the ball head rod 53 of the connecting linkage 50. The downward movement of the ball head rod 53 induces a downward pivoting of the adjusting lever 51 of the connecting linkage 50, whereby the crop stream engagement element 21 drivingly connected thereto is pivoted in the direction away from the inner surface 15.1 of the cover arrangement 15 such that the angling W1 is increased. The radial engagement depth of the crop stream engagement element 21 into the intermediate space Z1 is therefore increased.

In order to permit a displacement path of the crop stream engagement element 21 or an adjustment range for the angling W1 to be steplessly changed or adjusted, respective ball heads (not labeled separately) of the ball head rod 53 of the connecting linkage 50 can be adjusted via a screwing adjustment such that a length of the ball head rod 53 is adjusted.

As is best evident from FIGS. 3 and 4, each crop stream engagement 21 is designed so as to be closed in a planar manner over a predetermined width section 21.1 proceeding from the longitudinal edge 22 of the crop stream engagement element that is supported on the pivot axis S1, wherein adjoining the width section 21.1, which is closed in a planar manner, is a plurality of engagement fingers 21.2, which extend next to one another in a comb-like manner, the free ends of which jointly define the other longitudinal edge 23 of the crop stream engagement element 21.

According to the invention, the engagement fingers 21.2 extend in the direction of the pivot axis S1 of the separating rotor 17 without inclination such that the engagement fingers do not affect the transport of the crop stream in the axial direction, or the engagement fingers 21.2 extend in the direction of the longitudinal axis LA of the separating rotor 17 with a predetermined inclination such that the engagement fingers affect the transport of the crop stream in the axial direction in a targeted manner.

For example, the engagement fingers 21.2 of the crop stream engagement elements 21 can extend in the direction of the longitudinal axis LA of the separating rotor 17 at such an inclination that the extension direction thereof corresponds to that of the guide elements 15.2, which, due to the spiral-shaped extension thereof, have a directional component in the axial direction of the separating rotor 17.

As is evident from FIG. 4 in particular, the passage slot 15.3 of the cover arrangement 15 has such a width around the circumference of the separating rotor 17 and the crop stream engagement elements 21 are shaped such that the crop stream engagement elements 21 can each rest against the inner surface 15.1 of the cover arrangement 15 given a minimum angling W1. In this manner, a stable and defined end position can be provided for each crop stream engagement element 21 in a minimum engagement position (i.e., given a minimum angling W1) of the crop stream engagement elements 21, which can also be an out-of-operation position.

Given that the width section 21.1 of each crop stream engagement element 21, which is closed in a planar manner, is wider than the passage slot 15.3, the crop stream engagement elements 2, given a minimum angling W1 thereof, can close the passage slot 15.3 in the region of the respective longitudinal extension thereof, as indicated in FIG. 4.

In order to permit the pneumatic cylinders 42 of the drive units 41 of the drive means 40 to be activated separately from outside the housing 11 in order to drive the adjustment of the respective crop stream engagement elements 21 separately, each pneumatic cylinder 42 is fluidically connected, via compressed air lines 44, 45 extending outside the housing, to a control valve arrangement (not shown), which, in turn, is fluidically connected to a compressed air source (not shown) of the combine harvester. The control valve arrangement also has a signal connection to the control device (not shown) of the combine harvester for the activation of the control valve arrangement.

As an alternative, the drive units 41 can comprise hydraulic cylinders instead of pneumatic cylinders, which are fluidically connected to a corresponding control valve arrangement by corresponding hydraulic lines. Also, electric drives such as linear motors, for example, can be used as drive units 41.

LIST OF REFERENCE SIGNS

1 separating assembly
10, 10' separating device
11 housing
13 separating grate arrangement
14 separating grate
15 cover arrangement
15.1 inner surface
15.2 guide element 15.3 passage slot
16 cover element
17 separating rotor
18 driving element
20 crop stream engagement means
21 crop stream engagement element
21.1 width section
21.2 engagement finger
22 longitudinal edge
23 longitudinal edge
24 sleeve
25 axle part
40 drive means
41 drive unit
42 pneumatic cylinder
43 connecting rod
44 compressed air line
45 compressed air line
50 connecting linkage
51 adjusting lever
52 rocker arm
53 ball head rod
60 covering arrangement
61 covering element
62 passage opening
F1 axial conveyance direction
F2 circumferential conveyance direction
LA longitudinal axis
RR rotational direction
S1 pivot axis
S2 pivot axis
W1 angling
Z1 intermediate space As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A separating device for a combine harvester that operates according to the principle of axial flow, the separating device comprising:
a housing having a separating grate arrangement and a cover arrangement that together jointly form a hollow cylinder; and
a separating rotor arranged in the hollow cylinder of the housing in a rotatably supported manner such that an intermediate space (Z1) is defined between the housing and the separating rotor for conveying crop circumferentially and along a longitudinal axis (LA) of the separating rotor;
a plurality crop-stream engagement elements disposed lengthwise on an inner surface of the cover arrangement facing the separating rotor, one behind the other along the longitudinal axis (LA) of the separating rotor;
wherein each crop stream engagement element engages radially, in a ramp-type manner, around a circumference of the separating rotor, into a crop stream that circulates in the intermediate space (Z1) during the circumferential conveyance of the crop stream; and
a plurality of drive units connected respectively to each of the crop stream engagement elements drive an adjustment depth thereof into the intermediate space (Z1);
wherein each of the drive units is activated from outside the housing in order to drive each respective adjustment.

2. The separating device according to claim 1, wherein each crop stream engagement element has a width that is bordered by two longitudinal edges extending along the longitudinal axis (LA) of the separating rotor and a length that extends along the longitudinal axis (LA) of the separating rotor that corresponds to at least a portion of an axial extension of an inner surface of the cover arrangement.

3. The separating device according to claim 2, wherein one of the two longitudinal edges of the crop stream engagement element is pivotably mounted on a pivot axis (S1) extending along the longitudinal axis (LA) of the separating rotor such that, in order to adjust the crop stream engagement element, an angling (W1) defined between the inner surface of the cover arrangement and the crop stream engagement element is changed by pivoting the crop stream engagement element about the pivot axis (S1).

4. The separating device according to claim 3, wherein a passage slot that extends lengthwise along the longitudinal axis (LA) of the separating rotor is formed in the cover arrangement; wherein the crop stream engagement element is inserted lengthwise into the passage slot such that the one longitudinal edge that is mounted on the pivot axis (S1) protrudes outwardly out of the housing and another longitudinal edge of the crop stream engagement element is disposed within the housing; and wherein a pivot axis (S2) is disposed outside of the housing.

5. The separating device according to claim 4, wherein the passage slot has such a width around the circumference of the separating rotor that the crop stream engagement element rests against the inner surface of the cover arrangement given a minimum angling (W1).

6. The separating device according to claim 4, wherein the crop stream engagement element, given a minimum angling (W1) thereof, closes the passage slot in a region of the length of the crop stream engagement element.

7. The separating device according to claim 5, further comprising a covering arrangement having a length along the longitudinal axis (LA) of the separating rotor that corresponds at least to the length of the passage slot and a width around the circumference of the separating rotor that is greater than the width of the passage slot; wherein the covering arrangement is disposed radially outward of the pivot axis (S1) and lengthwise along the length of the passage slot such that the covering arrangement covers the passage slot so as to span the width thereof.

8. The separating device according to claim 7, wherein the covering arrangement comprises at least one passage opening in a region of the pivot axis (S2), wherein the drive units are disposed outside of the housing and wherein each crop stream engagement element is drivingly connected to the respective drive unit through the at least one passage opening.

9. The separating device according to claim 8, wherein each crop stream engagement element is designed to be closed in a planar manner over a predetermined width section proceeding from the one longitudinal edge supported on the pivot axis (S1), wherein a plurality of engagement fingers adjoin the width section that is closed in the planar manner and wherein the engagement fingers extend next to one another in a comb-like manner with free ends that jointly define the other longitudinal edge of the crop stream engagement element.

* * * * *